United States Patent
Cuciurean-Zapan et al.

(10) Patent No.: US 7,663,782 B2
(45) Date of Patent: Feb. 16, 2010

(54) SYSTEM AND METHOD FOR HIGH ADDRESSABLE BINARY IMAGE GENERATION USING RANK ORDERED ERROR DIFFUSION ON PIXELS WITHIN A NEIGHBORHOOD

(75) Inventors: Clara Cuciurean-Zapan, Fairport, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 514 days.

(21) Appl. No.: 11/340,380

(22) Filed: Jan. 26, 2006

(65) Prior Publication Data

US 2007/0171475 A1 Jul. 26, 2007

(51) Int. Cl.
*G06K 15/00* (2006.01)

(52) U.S. Cl. .................... 358/3.03; 358/3.04; 358/3.06; 382/252; 382/237

(58) Field of Classification Search ....... 358/3.03–3.05, 358/1.9, 3.01, 3.06; 382/252, 232, 237
See application file for complete search history.

(56) References Cited

U.S. PATENT DOCUMENTS

| | | | |
|---|---|---|---|
| 4,958,236 A | 9/1990 | Nagashima et al. | |
| 5,008,950 A | 4/1991 | Katayama et al. | |
| 5,293,430 A | 3/1994 | Shiau et al. | |
| 5,323,232 A | 6/1994 | Otaka et al. | |
| 5,754,710 A | 5/1998 | Sekine et al. | |
| 5,818,964 A | 10/1998 | Itoh | |
| 5,850,474 A | 12/1998 | Fan et al. | |
| 5,959,290 A | 9/1999 | Schweid et al. | |
| 6,130,966 A | 10/2000 | Sekine et al. | |
| 6,240,205 B1 | 5/2001 | Fan et al. | |
| 6,282,325 B1 | 8/2001 | Han | |
| 6,285,464 B1 | 9/2001 | Katayama et al. | |
| 6,343,159 B1 | 1/2002 | Cuciurean-Zapan et al. | |
| 6,477,282 B1 | 11/2002 | Ohtsuki et al. | |
| 6,594,401 B1 | 7/2003 | Metcalfe et al. | |
| 6,608,701 B1* | 8/2003 | Loce et al. | 358/3.09 |
| 6,683,702 B1 | 1/2004 | Loce et al. | |
| 6,771,832 B1* | 8/2004 | Naito et al. | 382/252 |
| 6,873,437 B1 | 3/2005 | Kuwahara et al. | |
| 6,975,434 B1 | 12/2005 | Pilu et al. | |
| 7,079,289 B2* | 7/2006 | Loce et al. | 358/3.03 |

(Continued)

FOREIGN PATENT DOCUMENTS

EP  1583064  10/2005

(Continued)

OTHER PUBLICATIONS

Unofficial Partial File History for U.S. Appl. No. 11/268,147 as of Oct. 8, 2008.

(Continued)

*Primary Examiner*—Kimberly A Williams
(74) *Attorney, Agent, or Firm*—Duane C. Basch; Basch & Nickerson LLP (57) ABSTRACT

The disclosed system and method provide a binary image generation method. Used, for example, in a digital reprographic system, the method is suitable for eliminating printing artifacts for high addressable binary digital output, such as digital copies, using an optimized ordered error diffusion method with dynamically computable quantization error and dynamic binary output calculation.

19 Claims, 5 Drawing Sheets

U.S. PATENT DOCUMENTS

| | | | |
|---|---|---|---|
| 7,372,992 | B2 | 5/2008 | Ohshita |
| 7,440,139 | B2 | 10/2008 | Loce et al. |
| 7,460,276 | B2 | 12/2008 | Xu et al. |
| 2002/0181797 | A1 | 12/2002 | Young |
| 2003/0043210 | A1 | 3/2003 | Hanks |
| 2003/0090729 | A1* | 5/2003 | Loce et al. .............. 358/3.06 |
| 2004/0114814 | A1 | 6/2004 | Boliek et al. |
| 2004/0257623 | A1 | 12/2004 | Suzuki |
| 2005/0025374 | A1* | 2/2005 | Ishikawa ................ 382/252 |
| 2006/0077489 | A1 | 4/2006 | Zhang et al. |
| 2006/0115182 | A1 | 6/2006 | Deng et al. |
| 2006/0132847 | A1* | 6/2006 | Xu et al. ................ 358/3.03 |
| 2006/0228035 | A1* | 10/2006 | Ishikawa ................ 382/252 |
| 2006/0232798 | A1* | 10/2006 | Xu et al. ................. 358/1.9 |
| 2007/0053003 | A1 | 3/2007 | Loce et al. |
| 2007/0103731 | A1 | 5/2007 | Tse et al. |
| 2007/0109602 | A1 | 5/2007 | Tse |
| 2007/0172148 | A1 | 7/2007 | Hawley |
| 2007/0172149 | A1 | 7/2007 | Cuciurean-Zapan et al. |
| 2007/0258101 | A1 | 11/2007 | Nagarajan et al. |
| 2008/0049238 | A1 | 2/2008 | Nagarajan et al. |

FOREIGN PATENT DOCUMENTS

| | | |
|---|---|---|
| GB | 2291308 | 1/1996 |

OTHER PUBLICATIONS

He, Z.; Chang, T.; Allebach, J.; Bouman C.; Boundary Stitching Algorithm for Parallel Implementation of Error Diffusion; Xerox Corporation.

Farzin Aghdasi and Rahab K. Ward, Reduction of Boundary Artifacts in Image Restoration, IEEE Transactions on Image Processing, vol. 5, No. 4, Apr. 1996, pp. 611-618.

Unofficial Partial History for US Patent 7440139.

Unofficial Partial File History for US Patent 7460276.

Unofficial Partial File History for U.S. Appl. No. 10/923,116 as of Dec. 9, 2008.

Unofficial Partial File History for U.S. Appl. No. 11/272,182, as of Feb. 10, 2009.

Unofficial Partial File History for U.S. Appl. No. 11/281,267 as of Jan. 27, 2009.

Loce et al.; U.S. Appl. No. 11/034,057, filed Jan. 13, 2005; Systems and Methods for Controlling a Tone Reproduction Curve Using Error Diffusion.

Xu et al.; U.S. Appl. No. 11/013,787, filed Dec. 17, 2004; Systems and Methods for Rank-Order Error Diffusion Image Processing.

Zhang et al.; U.S. Appl. No. 10/923,116, filed Aug. 20, 2004; Uniformity Compensation in Halftoned Images.

Loce et al.; U.S. Appl. No. 11/104,758, filed Apr. 13, 2005; Blended Error Diffusion and Adaptive Quantization.

Loce et al.; U.S. Appl. No. 11/218,966, filed Sep. 2, 2005; Color Management of Halftoned Images.

Unofficial Partial File History for U.S. Appl. No. 11/467,584 as of Oct. 8, 2008.

Unofficial Partial File History for U.S. Appl. No. 11/126,970 as of Dec. 8, 2008.

Unofficial Partial File History for U.S. Appl. No. 11/340,380 as of Nov. 17, 2008.

Unofficial Partial File History for U.S. Appl. No. 11/272,182, as of Oct. 6, 2008.

Unofficial Partial File History for U.S. Appl. No. 11/340,391, as of Oct. 6, 2008.

Unofficial Partial File History for U.S. Appl. No. 11/281,267 as of Oct. 8, 2008.

Unofficial Partial File History for U.S. Appl. No. 11/268,147 as of Oct. 8, 2008.

He, Z.; Chang, T.; Allebach, J.; Bouman C.; Boundary Stitching Algorithm for Parallel Implementation of Error Diffusion; Xerox Corporation, SPIE, vol. 5293, No. 349, Jan. 2004 pp. 344-355.

Farzin Aghdasi and Rahab K. Ward, Reduction of Boundary Artifacts in Image Restoration, IEEE Transactions on Image Processing, vol. 5, No. 4, Apr. 1996, pp. 611-618.

Unofficial Partial File History for US Patent 7440139, as of Dec. 17, 2008.

Unofficial Partial File History for US Patent 7460276, as of Dec. 17, 2008.

Unofficial Partial File History for U.S. Appl. No. 10/923,116 as of Dec. 9, 2008.

Unofficial Partial File History for U.S. Appl. No. 11/104,758 as of Dec. 9, 2008.

Unofficial Partial File History for U.S. Appl. No. 11/218,966 as of Dec. 9, 2008.

Unofficial a file history between Dec. 17, 2008 and Sep. 2, 2009 for U.S. Appl. No. 11/340,391.

* cited by examiner

SYSTEM AND METHOD FOR HIGH ADDRESSABLE BINARY IMAGE GENERATION USING RANK ORDERED ERROR DIFFUSION ON PIXELS WITHIN A NEIGHBORHOOD

The disclosed system and method provide a binary image generation technique, and more particularly, a system and method suitable for eliminating printing artifacts for high addressable binary digital output such as digital copies using an optimized ordered error diffusion method with dynamically computable quantization error and dynamic binary output calculation.

BACKGROUND AND SUMMARY

When standard error diffusion is applied to scanned documents in the copy image path, many isolated dots are created in the resultant image. Some print engines are not capable of printing/reproducing these isolated pixels accurately and systematically, which leads to unwanted image quality artifacts in the copies, such as uneven and patchy image areas. The image quality of text and line art is also impacted, even in the case of high addressable printing.

Rank order error diffusion (ROED), such as disclosed by (i) R. Loce et al., in U.S. application Ser. No. 09/968,651, filed Oct. 1, 2001, (U.S. Publication 20030090729) for, "RANK-ORDER ERROR DIFFUSION IMAGE PROCESSING"; (ii) R. Loce et al., in U.S. application Ser. No. 11/034,057, filed Jan. 13, 2005, for "SYSTEMS AND METHODS FOR CONTROLLING A TONE REPRODUCTION CURVE USING ERROR DIFFUSION"; (iii) B. Xu et al., U.S. application Ser. No. 11/013,787, filed Dec. 17, 2004 for "SYSTEMS AND METHODS FOR RANK-ORDER ERROR DIFFUSION IMAGE PROCESSING"; and (iv) Y. Zhang et al., U.S. application Ser. No. 10/923,116, filed Aug. 20, 2004, for "UNIFORMITY COMPENSATION IN HALFTONED IMAGES", all of which are hereby incorporated in their entirety for their teachings, has numerous applications and is an excellent starting step for eliminating artifacts in non high addressable output. However, some artifacts are likely to remain. In the high addressable binary image context, rank order error diffusion combined with compact high addressable pixel creation, as described for example in (i) U.S. application Ser. No. 11/034,057; (ii) U.S. application Ser. No. 11/013,787; and (iii) U.S. Pat. No. 6,683,702 to R. Loce et al., for "Compact-Dot Reproduction of Scanned Halftone Screens," also incorporated by reference in its entirety, generates unwanted patterning artifacts.

Implementation of rank order error diffusion as described in (i) U.S. application Ser. No. 09/968,651; or (ii) U.S. application Ser. No. 11/104,758, by R. Loce et al., filed Apr. 13, 2005, for "BLENDED ERROR DIFFUSION AND ADAPTIVE QUANTIZATION", also hereby incorporated by reference in its entirety, may be prohibitive in high-speed image paths. Rank order error diffusion is also disclosed in: U.S. application Ser. No. 11/218,966, by R. Loce et al., filed Sep. 2, 2005 for "COLOR MANAGEMENT OF HALFTONED IMAGES", which is also hereby incorporated by reference in its entirety.

Accordingly, a modified and less computationally intensive ordered error diffusion method, a different technique of generating the high addressable binary output, and a different technique of calculating the quantization error based on local context, are needed for the copy path to meet increased throughput speed and image quality requirements. The disclosed system and method provide a binary image generation method using ordered error diffusion with optimized and improved image processing speed and image quality for eliminating printing artifacts for digital output such as copies.

Disclosed in embodiments herein is a method for processing an input image, comprising: creating binary output by thresholding a current grayscale input image pixel and an associated intermediate predicted pixel value; calculating a pixel quantization error based upon the current image pixel value and the intermediate predicted pixel value; ordering a plurality of neighboring pixels of the current pixel located in a predefined processing window according to their gray values; diffusing a maximum possible amount of quantization error for the current image pixel sequentially to a subset of the plurality of neighboring pixels of the current pixel, where the subset of the plurality of neighbors are selected in accordance with the sign of quantization error; and repeating the steps above for each input pixel in the image to produce an error-diffused output image.

Also disclosed in embodiments herein is a method creating a halftoned image, comprising: receiving a pixel value from an input image; selecting an processing window encompassing M neighboring pixels; selecting a threshold; thresholding the pixel value with the selected threshold to make a binary marking decision; calculating a quantization error value based on the pixel value and the binary marking decision; and diffusing quantization error to at least one selected neighboring pixel(s) N within the diffusion mask M, based on the calculated error value, the selection being based on pixel values of a plurality of neighboring pixels within the diffusion window.

Further disclosed in embodiments herein is a digital reprographic system, comprising: an image source; an image processor, for processing each input pixel of an input image from said image source to produce an error-diffused output image, said image processor including a thresholder for creating binary output and an associated intermediate predicted pixel value as a function of a current image pixel; a pixel error calculator for calculating pixel quantization error based upon the current image pixel value and the intermediate predicted pixel value; a pixel ordering circuit for ordering the current input image pixel's M neighboring pixels located in a predefined processing window according to their gray values, said ordering circuit further diffusing the quantization error for the current image pixel sequentially to N out of the M neighbors of the current pixel, where N is not greater than M; where the N neighbors are selected depending on the sign of quantization error, and an image output terminal for outputting the error-diffused output image.

DETAILED DESCRIPTION

The following disclosure sets forth embodiments for a system and method. However, it will be appreciated that the disclosed features and functions, and alternatives thereof, may be combined into alternative systems or applications. For example, in FIG. 1, there is depicted a flowchart that depicts the primary operations of the disclosed method. Similarly, FIG. 2 depicts a schematic block diagram of a digital reprographic or multifunction system wherein certain functional components are identified as providing an embodiment suitable for operation of the system as described relative to FIG. 1.

Figure 3:
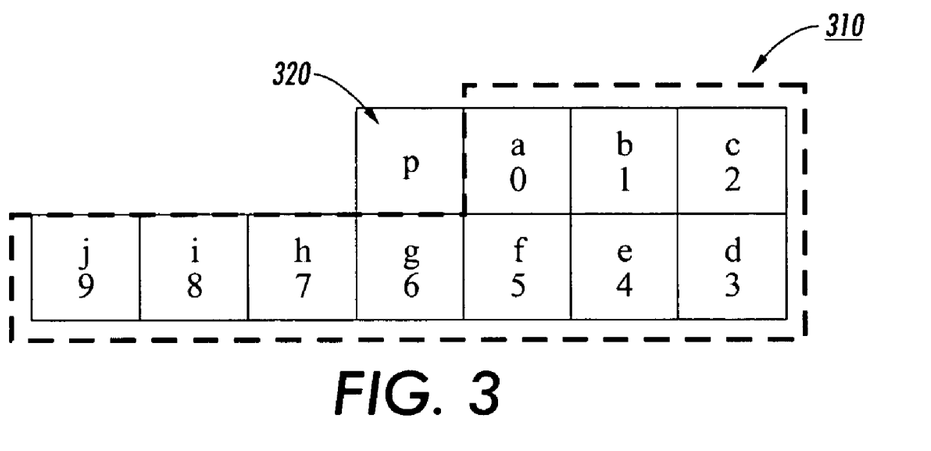
FIG. 3 is an illustration of an exemplary error diffusion window to which the method of FIG. 1 may be employed.

Referring briefly to FIG. 3, there is depicted an example of a processing window for use with an error diffusion operation in accordance with an aspect of the disclosure that follows. In particular, window 310, includes a plurality of pixels (a, b . . . j) located at defined positions (0, 1, . . . , 9) adjoining a current pixel "p" (320). As used herein, the pixels in the window are temporarily stored in an array of size M (e.g., edarray[10] where edarray[i] corresponds to position i in window 310).

Figure 1:
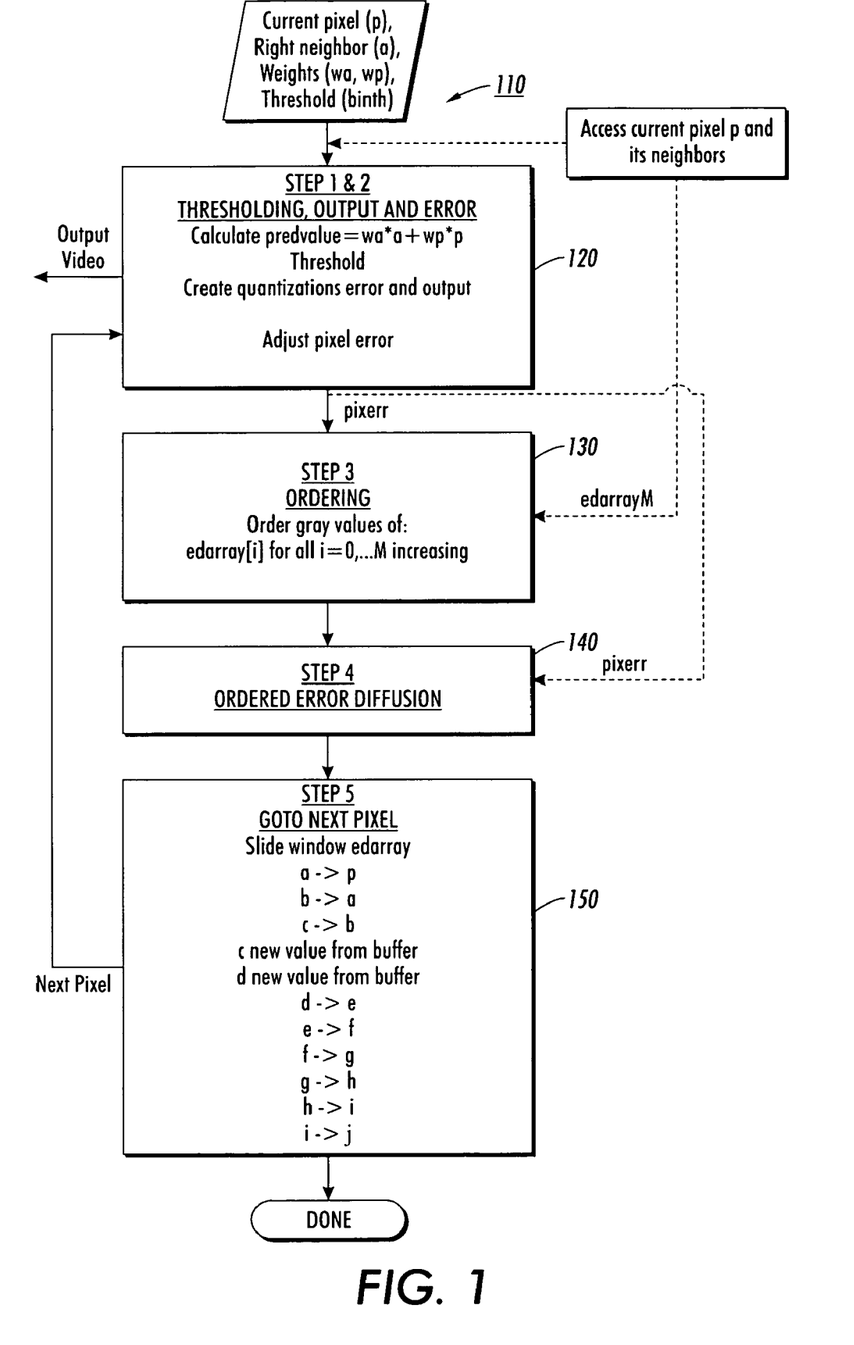
FIG. 1 is a flow diagram illustrating aspects of an embodiment of the method disclosed herein.
Figure 2:
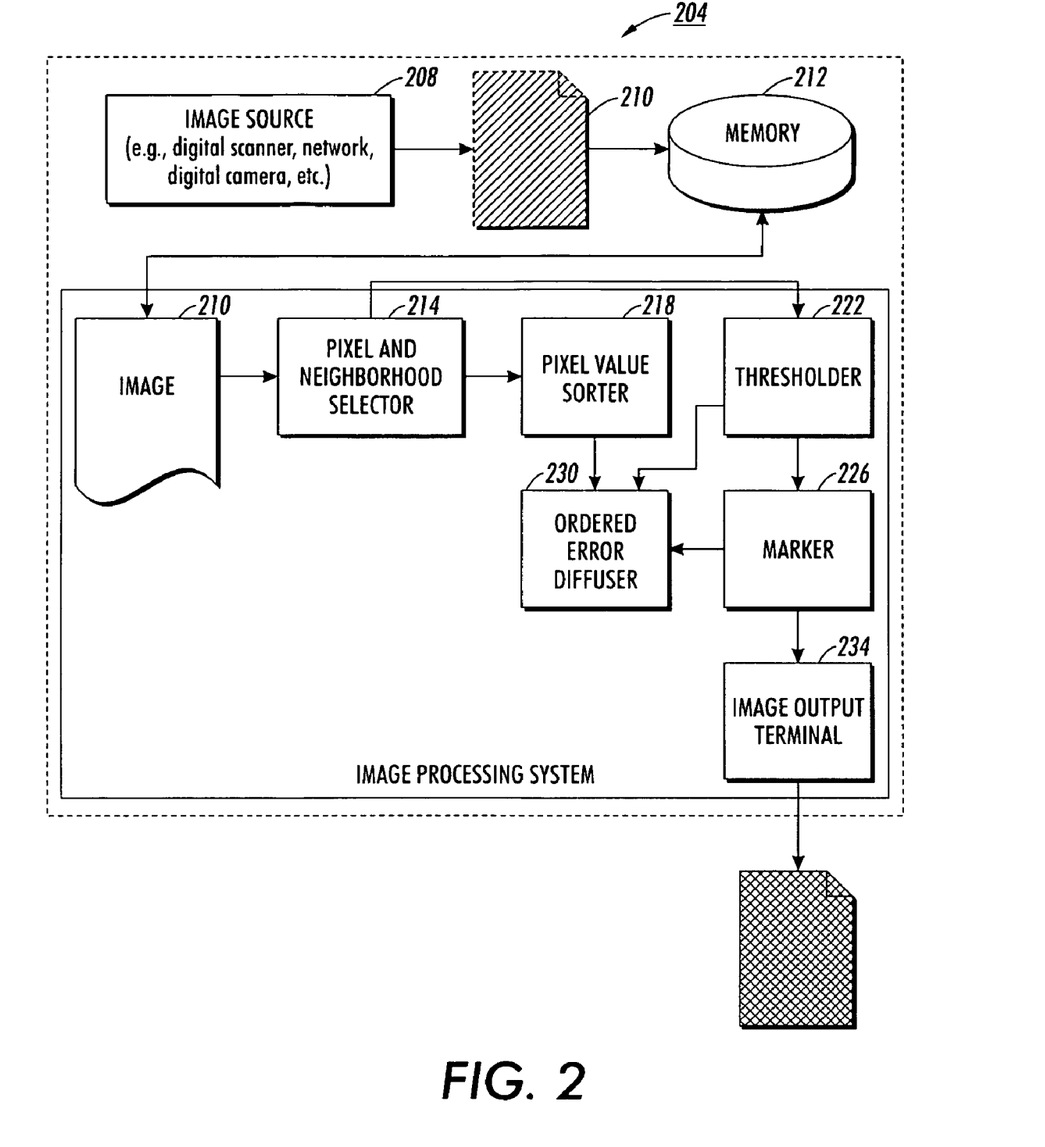
FIG. 2 is a block diagram of a portion of an image processing system operative to perform the method of FIG. 1.
Figure 4:
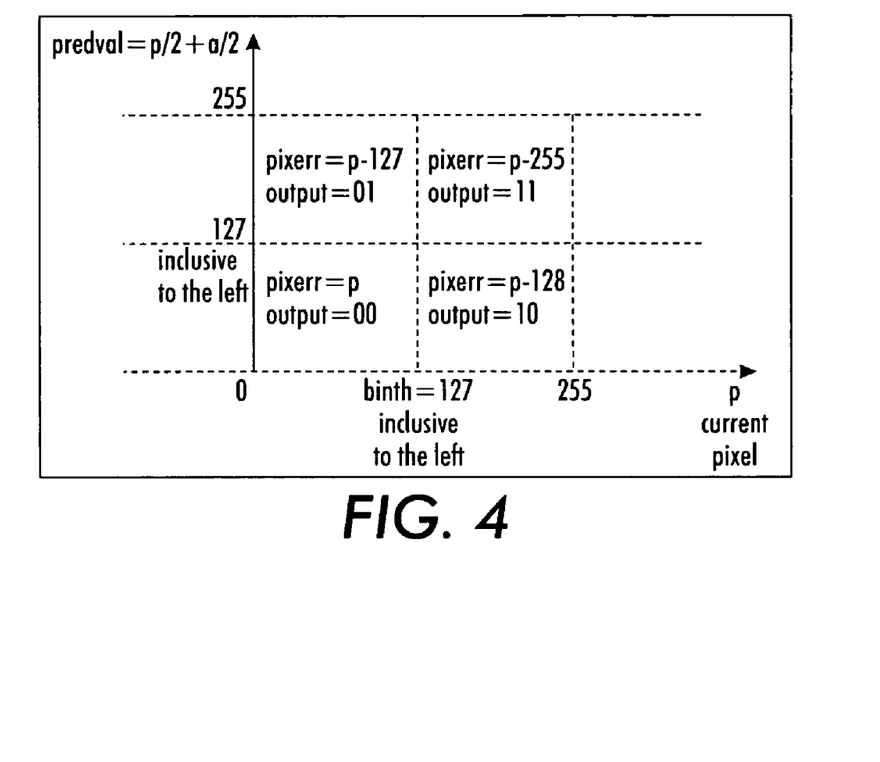
FIGS. 4 and 5 are illustrative representations of the dynamically computable quantization error and dynamic binary output calculation.
Figure 5:
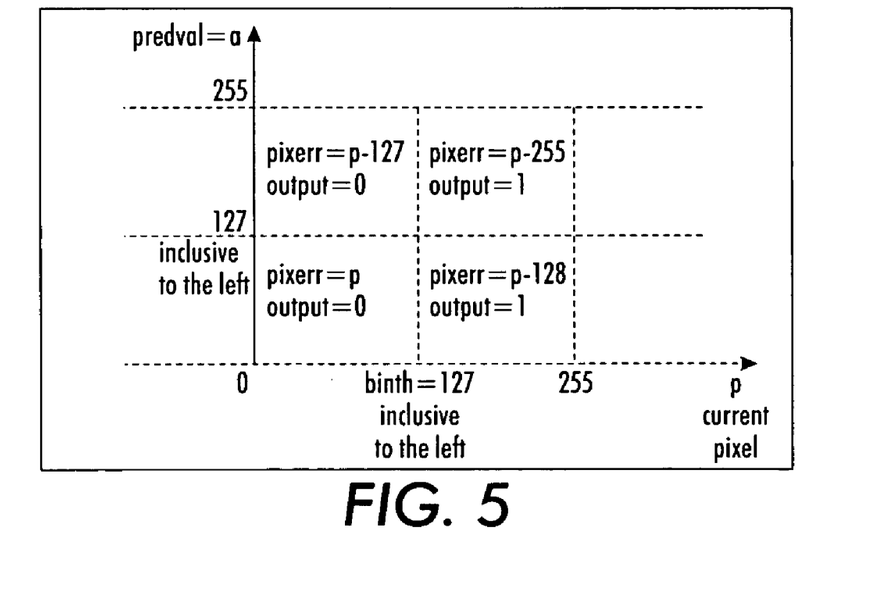

Referring to FIG. 1, there is depicted a method 110 for processing a continuous tone or multi-quantization level input image, high addressable to produce possibly high addressable binary output image representative thereof and without print engine artifacts. Method 110 comprises creating a binary output by thresholding a current grayscale input image pixel and an associated intermediate predicted pixel value. It will be appreciated that the disclosed method finds particular use in high addressable images, and one embodiment hereof contemplates such a possibility as will be further described relative to FIGS. 4 and 5. Respectively, FIGS. 4 and 5 illustrate the manner in which thresholding may be performed for a 2× and a 1× (non) high addressable case. In the 2× case of FIG. 4, depending upon the current pixel value (p) and the intermediate predicted value (predval), the possibly binary high addressable output values are 00, 01, 10, or 11, and the pixel error (pixerr) to be propagated is calculated as a function of the current pixel value (p) and the intermediate predicted value predval (e.g., for p=215 and predval=200, pixerr=−40). In other words, a binary output is created by thresholding a current grayscale input image pixel and a intermediate predicted pixel value, producing a high addressable binary representation of the grayscale input image pixel, where the quantization error for the current pixel is a function of the high addressable binary representation.

In one embodiment, predval is determined as a function of the current pixel (p) and the next adjacent pixel (a) as depicted in FIG. 3, where $$predval = wa \cdot a + wp \cdot p,$$

and where wa and wp are respective weighting variables. The thresholding operation depicted in FIG. 5 is similar, but is directed to a 1× (non high addressable) case, and hence the outputs are simply a single binary value.

Returning to FIG. 1, operation 120 of the method 110 further comprises calculating a pixel error based upon the current image pixel value and the intermediate predicted pixel value. As noted above, the function used to calculate quantization error (pixerr) is a function of the current pixel (p) and the intermediate predicted value (predval), as represented in the examples of FIGS. 4 and 5. It will be appreciated that the disclosed method of calculating quantization error is different that that suggested by the Loce et al. as noted above. After thresholding, the quantization error for the current image pixel is diffused sequentially to N out of the M neighbors of the current pixel, where N is not greater than M; where the N neighbors are the N biggest or N smallest pixel values in the window of M neighboring pixels depending if the quantization error is positive or negative, respectively, The N neighbors are picked from the edarray[M] in the order corresponding to the sign of the quantization error (increasing if the sign of the quantization error is negative, decreasing if the sign is positive). A saddr[M] memory array or buffer is used as an address buffer, wherein the addresses point to the edarray[i] values in the respective (increasing or decreasing) order. More specifically, the process may be generally characterized by the following code section:

```
if (pixerr >= 0)
    for all i=0,...,N
    {
    deltaer = pixerr
    if (value at saddr[i] + deltaer> 255) deltaer = 255 − value at saddr[i]
    pixerr = pixerr − deltaer
    value at saddr[i] = value at saddr[i] + deltaer
    }
else
    for all i=0,...,N
    {
    deltaer = pixerr
    if (value at saddr[i] + deltaer<0) deltaer = − value at saddr[i]
    pixerr = pixerr − deltaer
    value at saddr[i] = value at saddr[i] + deltaer
    }
```

Continuing with FIG. 1, the ordering of the current input image pixel's M neighboring pixels in the processing window is accomplished as depicted at 130—according to the gray values of the neighboring pixels. As indicated in before, a saddr[10] memory array or buffer is used as an address buffer, wherein the addresses point to the edarray[i] values in the respective (increasing or decreasing) order. Therefore, as the image is scanned from left to right and top to bottom, the ordering can be implemented in parallel in hardware and/or (as the processing window "slides") only the new pixels have to be ordered with respect to the overlapping old ones.

The diffusion operation 140 intentionally diffuses a maximum possible amount of quantization error for the current image pixel, sequentially, to the N neighbors of the current pixel. The diffusion process is applied in this instance only to the first N (e.g., N=4) ordered neighbors in the processing window (out of M neighbors). In one embodiment the following values were used: M=10 and N=4. As will be appreciated, other combinations may be employed depending on the imaging characteristics of the system and the hardware.

As the pixels are ordered it is possible to pre-calculate (perhaps using a lookup table) how much error remains to saturate each pixel in the processing window (of size 10 in this embodiment) and at what point the pixel error will be consumed. This index and partial sums may be used in instantly performing the ordered error diffusion operation 140, by knowing that all the pixels in the processing window with the calculated sum (see code below) less or equal to the pixel error (pixerr) become 0 or 255 (in an 8-bit per pixel imaging system):

```
satsum = 0;
index=0;
if (pixerr >= 0)
{
    for (i=0; i<9; i++)
    {
        satsum=satsum + 255 − edarray[i];
        if( satsum > pixerr )
        {
```

-continued

```
            index = i;
            break;
        }
    }
else
{
    for (i=0; i<9; i++)
    {
        satsum=satsum−edarray[i];
        if( satsum > pixerr )
        {
            index = i;
            break;
        }
    }
}
```

Furthermore, as represented by operation 150 of FIG. 1, the process is repeated using the steps above until the input pixels in the image have been processed to produce an error-diffused output image. The processing is likely done in raster order, but other processing orders (e.g., serpentine) are feasible.

Referring to FIG. 2, a portion of an image processing system 204 operative to perform the method disclosed above, including performing ordered error diffusion, includes an image source such as a digital or digitizing scanner 208 to produce an image 210, which may be stored in memory 212 (e.g., magnetic media, RAM, etc.). The image 210 is passed to a pixel and neighborhood selector 214, a pixel value sorter 218, a thresholder 222, a marker 226, an ordered error diffuser 230, and an output device such as an image output terminal 234 (e.g., a laser printer, photoprinter, etc.).

The pixel and neighborhood selector 214 selects a processing path or space-filling curve for processing the pixels of an image 210. Additionally, the pixel and neighborhood selector 214 selects or generates a diffusion mask or set of diffusion masks that is compatible with a selected processing path. The processing path selection can be based on input received from a system operator or based on an analysis of the image and known or default rendering preferences, as described for example in U.S. Patent Application 2003/0090729 by Loce et al., published May 15, 2003, for a "Rank-Order Error Diffusion Image Processing."

Selection of a preferred rendering characteristic is interpreted by the pixel and neighborhood selector 214 as a request for the use of a related processing path. Selection of a diffusion mask or set of masks may be based on a default, selected space-filling curve or may be based on operator input. The operator input may be an explicit mask selection, or may again be implied through the selection of a preferred rendering characteristic. Alternatively, the pixel and neighborhood selector 214 may analyze the image 210 and automatically select a space filling curve and diffusion mask(s) based on characteristics of the image.

Once the processing path and diffusion mask(s) have been selected, the pixel and neighborhood selector 214 follows the processing path working sequentially through the input image and selecting pixels of interest and neighboring pixels from the image and delivers information about them to the pixel value sorter 218 and the thresholder 222. The pixel value sorter 218 receives information about the current pixel and the neighboring pixels. The thresholder 222 simply receives information about the current pixel and its right neighbor.

For example, the pixel value sorter 218 simply receives pixel value information. Optionally, the pixel ranker 218 also receives pixel position information. The value sorter 218 orders the neighboring pixels based on their values. Optionally, the pixel value sorter 218 applies spatial weights to the pixel values of the neighboring pixels before sorting the neighboring pixels. Appropriate spatial weights may be either predetermined default values, indicated by an operator selected rendering preference, or are based on an analysis of the image performed by the pixel value sorter 218. Alternatively, the spatial weights include consideration of lightness or darkness variance of the neighboring pixels (i.e., processing generally uniform light or dark regions of the image preferentially. The pixel sorter 218 passes pixel information including, for example, pixel values, pixel ranks and pixel position information to the error diffuser 230.

The thresholder 222 receives pixel value and pixel location information about a current pixel. The thresholder 222 compares the pixel value of the current pixel to a threshold value. The threshold value may be a constant value (e.g., binth=127), used to compare to all the pixel values of the image or the threshold value may vary. For example, the threshold value may be taken from a halftone screen. The thresholder, however, operates in a manner consistent with FIGS. 4 and 5, where the output is a function of not only the threshold applied relative to the pixel value (p), but also as a function of the level of the intermediate predicted pixel value (predval) as described above. The thresholder then passes the results of the comparison to the marker 226. For example, the thresholder 222 tells the marker 226 whether or not the pixel value of the current pixel is above or below the threshold value and whether or not the intermediate predicted pixel value (predval) is above or below the threshold value (output=0 or 1 in the 1× case as described in FIG. 4; output=00, 01, 10 or 11 in the 2× case as described in FIG. 5), thereby permitting marker to record a binary indication of a mark. The thresholder also passes the pixel value of the current pixel on to the error diffuser 230. The threshold value for the current pixel and the threshold value for the predicted pixel value do not need to be the same.

The marker 226 makes a marking decision based on the results received from the thresholder. For example, if the pixel value is above the threshold value the marker decides to place a mark in a position in an output image corresponding to the current pixel. The output image may be an electronic image stored in an electronic memory or buffer. Alternatively, the output image may be an image formed by an outputting device such as an image output terminal 234. The marker 226 also passes a value related to the marking decision to the error diffuser 230. For example, the marker passes to the error diffuser 230 a value corresponding to a fully saturated mark, such as, for example, 255 (in an eight-bit system) or a value corresponding to a fully unsaturated mark (white or no mark), such as, for example zero.

The error diffuser 230 compares the value received from the marker to the pixel value of the current pixel and calculates an error value. The error diffuser then transfers or distributes error to one or more neighboring pixels N (from within the diffusion window 310). The error transfer or distribution is based on the sorting performed by the pixel value sorter 218. Therefore, the error transfer or distribution is based on lightness or darkness of the neighboring pixels, as indicated by one or more pixel values of the pixels. Optionally, the sorting, and therefore the error transfer or distribution, is additionally based on the spatial position of the neighboring pixels. For example, a distance of neighboring pixels from a current pixel may be taken into account during the ranking. Alternatively or additionally, the positions of the neighboring pixels relative to an associated halftone dot are accounted for during the sorting. As explained above, all the error may be transferred to a plurality of pixels N, where N≦M. Error can also be transferred or distributed in a weighted or non-weighted manner. Whether weighted or not, error can further be transferred or distributed in a clipped or limited manner or in an unlimited manner.

By transferring or distributing error, the error diffuser 230 modifies or updates pixel values of some of the neighboring pixels from the image 210. The pixel and neighborhood selector 214 then selects a new current pixel and a new related set of neighboring pixels based on the previously selected window. The functional blocks 214, 218, 222, 226, 230 then repeat their functions for the new current pixel.

While the image is being processed, or when the entire image has been processed, the marking decisions made by the marker 226 can be delivered to the outputting device 234, or temporarily stored in a memory such as memory device 212. As noted previously, the outputting device can be a binary outputting device or a multi-quantization level outputting device. In a xerographic environment the outputting device 234 is a xerographic printer. Xerographic printers are known to include a fuser, a developer, and an imaging member for receiving an exposure source (e.g., light) in response to the marks for the image. In other environments the outputting device 234 may be a display or other printing device such as an ink jet, lithographic or ionographic printer.

The above-described portion of an image processing system 204, operative to perform the method of FIG. 2 can be implemented in many ways. For example, the pixel and neighboring pixel selector 214, pixel value sorter 218, thresholder 222, marker 226, and error diffuser 230 may be implemented in software or in dedicated hardware components operating under software control. The software is stored in a computer memory and run on one or more computational devices such as, for example, a microprocessor(s) or digital signal processor(s). The functional blocks 214, 218, 222, 226, 230 can be physically located in, or performed by, a single device or can be distributed over an interconnected computer network (not shown).

Having described the general steps in accordance with the method of FIG. 1 and the system depicted in FIG. 1, attention is now turned to further alternatives to the disclosed embodiments. More specifically, the method described above may further comprise resetting the quantization error to zero upon detecting a region of the input image having pixel values consistently near one extreme (all light or all dark) of the gray scale. The error is reset each time the pixels in the window are all light or all dark and the error is in a certain range to avoid generating dots/holes in very light/dark regions as controlled by the following code section:

```
( if (edarray[i]<=lowth for all i=0,..,9) OR if (edarray[i]>=highth
    for all i=0,..,9) )
    AND
    if errth1 <= pixerr <=errth2
    then
        pixerr=0
```

As will be appreciated, the lower threshold (lowth) and higher threshold (highth) used to determine whether a region of pixels lies near an extreme of the continuous tone range, may be predefined. (i.e., lowth defining the range of light areas whereas highth defines the range of dark areas). In one embodiment, the lowth variable was set equal to 5, and the highth threshold was set equal to 250. The additional thresholds, errth1 and errth2, control the magnitude of error that may be reset. In one embodiment, the errth1 variable was set equal to −127, and the errth2 threshold was set equal to 5. If errth1=−127 and errth2=127 then any amount of quantization error may be reset.

Further contemplated in accordance with an aspect of the disclosed method is the use of statistical features simultaneously, when ordering the pixels in the processing window (max, min, mean, etc.), so that if the window is in a continuous tone area then the process switches to standard error diffusion. The advantage of such an approach is that typically standard error diffusion performs better on contone regions of scanned images.

Figure 6:
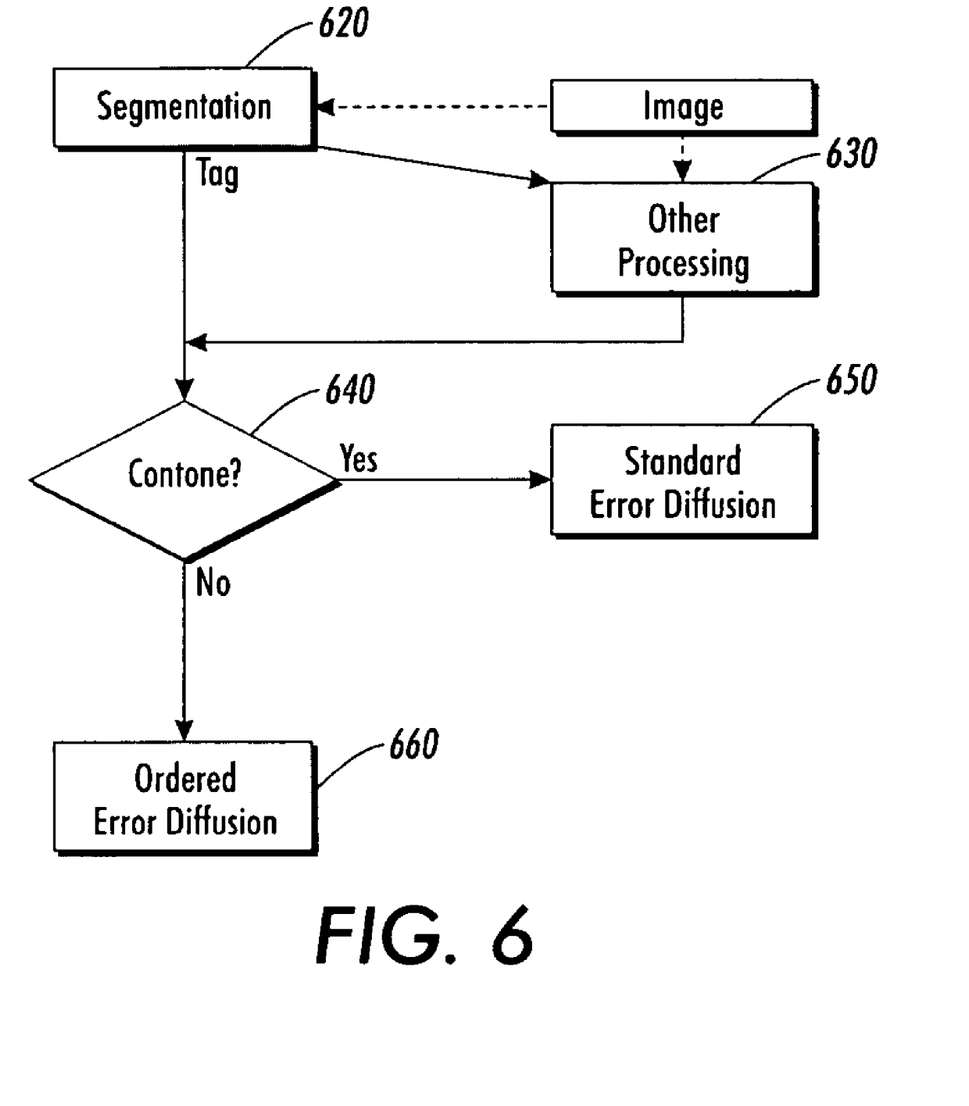
FIG. 6 is a flow diagram illustrating an alternative process employed with the method of FIG. 1.

Alternatively, if segmentation tags are already available in the image processing pipeline (e.g., text & line, halftone (any frequency), and contone/pictorial/photo) a choice may be made between the method described herein and standard error diffusion. An illustration of processing in accordance with this alternative embodiment is depicted in FIG. 6. Referring to FIG. 6, there is illustrated a segmentation pre-processing where the input image is first segmented (620) and processed in accordance with other image processing operations (e.g., enhancement, filtering, etc.) 630, to produce an output image. If the image, or a region thereof, is a continuous tone (contone) region, as detected at 640, then standard error diffusion is applied as represented by 650. Otherwise, in the event that a region is not identified as a contone segment, then processing continues in accordance with one of the embodiments described above. Although the flowchart of FIG. 6 indicates a dynamic or real-time segmentation and tagging operation, it is further contemplated that the pipeline may temporarily store segmentation information relative to an image and that the method, therefore, includes retrieving stored knowledge relating to the input image (such as segmentation tags); and based upon such knowledge, processing portions of the image using only standard error diffusion.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, operating on an image processor, for processing a multi-quantization level input image, comprising:

creating binary output by thresholding a current grayscale input image pixel and an associated intermediate predicted pixel value, wherein the associated intermediate predicted pixel value is calculated before thresholding;

calculating a pixel quantization error based upon the current image pixel value and the intermediate predicted pixel value;

ordering a plurality of neighboring pixels of the current pixel located in a predefined processing window according to their gray values;

diffusing a maximum possible amount of quantization error for the current image pixel sequentially to a subset of the plurality of neighboring pixels of the current pixel, where the subset of the plurality of neighbors are selected in accordance with the sign of quantization error; and repeating the steps above for each input pixel in the image to produce an error-diffused output image for output by image processor.

2. The method of claim 1, wherein the subset size is N, where N>1 and where the subset includes the N biggest pixel values in the plurality of neighboring pixels when the sign of the quantization error is positive.

3. The method of claim 1, wherein the subset size is N, where N>1 and where the subset includes the N smallest pixel values in the plurality of neighboring pixels when the sign of the quantization error is negative.

4. The method of claim 1, wherein creating binary output by thresholding the current grayscale input image pixel produces a high addressable binary representation of the grayscale input image pixel, and where the pixel error is a function of the high addressable binary representation.

5. The method of claim 1, further comprising resetting the pixel quantization error to zero upon detecting a region of the input image having pixel values consistently near one extreme of the gray scale.

6. The method of claim 5, further including detecting continuous tone regions within the input image by collecting gray value statistics from a processing window before error diffusion, and in such continuous tone regions, performing only standard error diffusion.

7. The method of claim 5, further including retrieving stored knowledge relating to the input image and, based upon such knowledge, processing portions of the image using only standard error diffusion.

8. The method of claim 1, wherein a subset of N neighbors are picked from M neighboring pixels in an order corresponding to the sign of the quantization error, where if the quantization error is positive, the N biggest pixel values of the M neighboring pixels are selected, and when the quantization error is negative, the N smallest pixel values of the M neighboring pixels are selected.

9. The method according to claim 1, wherein the intermediate predicted pixel value (predval) is determined as a function of the current pixel and a next adjacent pixel in accordance with the function $$predval = wa \cdot a + wp \cdot p,$$

where wa and wp are weighting variables.

10. A method creating a halftoned image, comprising:
receiving a pixel value from an input image;
selecting an processing window encompassing M neighboring pixels;
selecting a threshold;
thresholding the pixel value with the selected threshold to determine an intermediate predicted pixel value, wherein thresholding the input pixel value produces a high addressability binary representation of the grayscale input image pixel, and where the pixel error is a function of the high addressable binary representation;
calculating a quantization error value based on the pixel value and the intermediate predicted pixel value; and
diffusing quantization error to at least one selected neighboring pixel(s) N within the diffusion mask M, based on a sign of the calculated error value, the selection being based on pixel values of a plurality of neighboring pixels within the diffusion window.

11. The method of claim 10, further comprising resetting the pixel error value to zero upon detecting a region of the input image having pixel values consistently within a range of values near an extreme end of the gray scale.

12. The method of claim 11, further including detecting continuous tone regions within the input image by collecting gray value statistics from a processing window before error diffusion, and in such continuous tone regions, performing only standard error diffusion.

13. The method of claim 11, further including retrieving stored knowledge relating to the input image and based upon such knowledge, processing portions of the image using only standard error diffusion.

14. The method of claim 13, wherein the stored knowledge includes segmentation tags.

15. A digital reprographic system, comprising:
an image source;
an image processor, for processing each input pixel of an input image from said image source to produce an error-diffused output image, said image processor including
a thresholder for creating binary output and an associated intermediate predicted pixel value as a function of a current image pixel;
a pixel error calculator for calculating pixel quantization error based upon the current image pixel value and the intermediate predicted pixel value;
a pixel ordering circuit for ordering the current input image pixel's M neighboring pixels located in a predefined processing window according to their gray values, said ordering circuit further diffusing the quantization error for the current image pixel sequentially to N out of the M neighbors of the current pixel, where N is not greater than M; where the N neighbors are selected depending on the sign of quantization error, and
an image output terminal for outputting the error-diffused output image.

16. The system of claim 15, wherein the input image includes multi-bit grayscale data and where the thresholder operates on the current image pixel to produce a high addressability binary representation of the grayscale input image pixel.

17. The system of claim 16, wherein the pixel error calculator uses an error calculation function that is dynamically responsive to a combination of at least one of the group consisting of: the current image pixel value, the intermediate predicted pixel value, and the values of the current pixel's neighbors located in the processing window.

18. The digital reprographic system of claim 15, wherein the pixel ordering circuit includes an array for storing pixel values for M neighboring pixels and where N pixel values are picked from said array in the order corresponding to the sign of the quantization error, where if the quantization error is positive, the N biggest pixel values of the M neighboring pixels are selected, and when the quantization error is negative, the N smallest pixel values of the M neighboring pixels are selected.

19. The digital reprographic system of claim 18, further including an address buffer, wherein the addresses stored in the address buffer point to the N pixel values in the array in the order determined by the sign of the quantization error.

* * * * *